United States Patent
Tsuda et al.

(10) Patent No.: US 10,927,189 B2
(45) Date of Patent: Feb. 23, 2021

(54) CELLULOSE ACETATE AND PRODUCING METHOD THEREFOR

(71) Applicant: DAICEL CORPORATION, Osaka (JP)

(72) Inventors: Maiko Tsuda, Tokyo (JP); Akihiro Higuchi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 16/327,054

(22) PCT Filed: Aug. 21, 2017

(86) PCT No.: PCT/JP2017/029778
§ 371 (c)(1),
(2) Date: Feb. 21, 2019

(87) PCT Pub. No.: WO2018/038051
PCT Pub. Date: Mar. 1, 2018

(65) Prior Publication Data
US 2019/0218312 A1    Jul. 18, 2019

(30) Foreign Application Priority Data
Aug. 22, 2016 (JP) .............................. JP2016-162161

(51) Int. Cl.
| C08B 3/06 | (2006.01) |
| C08B 1/02 | (2006.01) |
| C08B 17/02 | (2006.01) |
| B02C 7/16 | (2006.01) |
| B02C 13/04 | (2006.01) |

(52) U.S. Cl.
CPC .................. C08B 3/06 (2013.01); C08B 1/02 (2013.01); C08B 17/02 (2013.01); *B02C 7/16* (2013.01); *B02C 13/04* (2013.01)

(58) Field of Classification Search
CPC .............. C08B 3/06; C08B 1/02; C08B 17/02
USPC ......................................................... 536/71
See application file for complete search history.

(56) References Cited

U.S. PATENT DOCUMENTS

| 2003/0092906 A1 | 5/2003 | Ozaki et al. |
| 2017/0145118 A1 | 5/2017 | Hosaka et al. |

FOREIGN PATENT DOCUMENTS

| JP | 9-286801 A | 11/1997 | |
| JP | 11-254466 A | 9/1999 | |
| JP | 2001-26601 A | 1/2001 | |
| JP | 2003-213004 A | 7/2003 | |
| JP | 2003-221455 A | 8/2003 | |
| JP | 2003-326112 A | 11/2003 | |
| JP | 2004-113897 A | 4/2004 | |
| JP | 2007-217470 | * 8/2007 | ............... C08B 3/16 |
| JP | 2007-217470 A | * 8/2007 | ............... C08B 3/16 |
| JP | 2007-217470 A | 8/2007 | |
| JP | 2008-56768 A | * 3/2008 | ............... C08B 3/06 |
| JP | 2008-56768 A | 3/2008 | |
| JP | 2009-11967 A | 1/2009 | |
| WO | WO 01/72847 A1 | 10/2001 | |
| WO | WO 2016/009461 A1 | 1/2016 | |

OTHER PUBLICATIONS

English translation of International Search Report dated Oct. 17, 2017, in PCT/JP2017/029778.
English translation of Written Opinion of the International Searching Authority dated Oct. 17, 2017, in PCT/JP2017/029778.
Office Action dated May 19, 2020, in Japanese Patent Application No. 2016-162161.

* cited by examiner

*Primary Examiner* — Ganapathy Krishnan
(74) *Attorney, Agent, or Firm* — Birch, Stewart, Kolasch & Birch, LLP

(57) ABSTRACT

The purpose of the present invention is to provide a cellulose acetate which can be used to obtain an optical film having a very small amount of bright spot foreign matters, with excellent production efficiency, even when cellulose containing a small amount of hemicellulose components and having a high degree of crystallinity is used as a raw material. A cellulose acetate in which a content ratio by mole of mannose units to a sum of xylose units, mannose units and glucose units, which are sugar chain components, is 0.04 mol % or less, and a filtration index K measured by the following measurement method is 30 mL$^{-1}$ or less. (Measurement method) The cellulose acetate is dissolved in a mixed solvent containing methylene chloride and methanol at a weight ratio of methylene chloride/methanol of 9/1 to obtain a solution with a solid concentration of 16% by weight. The temperature of the solution is adjusted to 25° C., and the solution is subjected to constant-pressure filtration under a pressure of 3 kg/cm$^2$ using a cloth obtained by stacking three sheets of calico (s 618) (diameter: 15 mm, filtration area: 1.77 cm$^2$). At this time, the filtration index k (mL$^{-1}$) is calculated from the following expression, where $P_1$ represents the amount of filtration (mL) up to 20 minutes after the start of filtration, and $P_2$ represents the amount of filtration (mL) from 0 to 60 minutes.

$$\text{Filtration index } K = \frac{2 - P_2/P_1}{P_1 + P_2} \times 10^4 \quad \text{[Mathematical Formula 1]}$$

5 Claims, 2 Drawing Sheets

CELLULOSE ACETATE AND PRODUCING METHOD THEREFOR

TECHNICAL FIELD

The present invention relates to a cellulose acetate and a method for producing the cellulose acetate.

BACKGROUND ART

Cellulose derivatives such as cellulose acetate (particularly cellulose triacetate) have been used as materials for various photographic materials and optical films because they have high optical isotropy, and are excellent in toughness and flame retardancy.

In recent years, in particular, development related to improvement of image quality and improvement of definition in image display devices such as smart phones, mobile phones and tablets has been advanced.

Accordingly, optical films such as retardation films, polarizing plate protection films, optical compensation films and anti-glare films, which are used for image display devices, have been increasingly required to have a reduced amount of foreign matters contained in the optical films.

Examples of the foreign matter contained in the optical film include foreign matters originating from additives, dust mixed in the production process, foreign matters originating from substances other than cellulose acetate, and foreign matters originating from non-acetylated cellulose acetate (i.e. cellulose) or low-acetylation-degree cellulose acetate contained in cellulose acetate. Among them, so-called black foreign matters originating from dust mixed in the production process directly cause optical defects. Mention is made of optical defects caused by so-called bright spot foreign matters in addition to those caused by black foreign matters.

The bright spot foreign matter is a foreign matter which appears as a bright spot with light leaked at a foreign matter part when a cellulose acetate film is placed between two polarizers arranged in such a manner as to orthogonally cross each other (orthogonal nicol arrangement), light is applied from outside one polarizer, and the cellulose acetate film is observed from outside the other polarizer with a microscope. Examples of the bright spot foreign matter include cellulose as a raw material or by-products derived from cellulose, i.e. unreacted cellulose remaining without being acetylated, low-acetylation-degree cellulose, esters, bonding products of cellulose esters bonded to each other through bonding sulfuric acid and a metal component (e.g. calcium), and mixtures thereof.

In order to remove these foreign matters, for example, PTL 1 discloses a method in which a dope liquid obtained by dissolving a cellulose ester in a solvent is deposited by passing through a filtration step in two or more stages (e.g. the first stage is a filtration step using a filter paper, and the second step is a filtration step which is a filtration step using a metal filter). PTL 2 discloses a method for filtering a cellulose ester solution using a cellulose filter paper, in which the cellulose filter paper includes retained particles having a minimum particle diameter of 3 μm or less and 0.5 μm or more, and has a thickness of 3.5 to 4.5 mm, and the water filtration time is 150 to 350 seconds. Further, PTL 3 discloses a cellulose ester film in which the number of bright spots having a diameter larger than 0.05 mm is 0 per 1 $cm^2$, and the number of bright spots having a diameter ranging from 0.01 mm to 0.05 mm is 500 or less per 1 $cm^2$. The document suggests that in order to remove insoluble matters and the like, a filtering medium having an absolute filtration accuracy of 0.005 mm or less (particularly in a range of 0.001 to 0.005 mm) is preferable, and by performing filtration with such a filtering medium having a high filtration accuracy, very small insoluble matters and impurities such as cellulose that is not esterified can be effectively removed.

PTL 4 discloses a method for filtering a polymer solution with a polymer dissolved in a solvent, the method including using a filtering medium having pores having a pore size larger than the size of at least one insoluble matter among insoluble matters contained in the polymer solution, and PTL 5 discloses a method for filtering a dope, in which foreign matters in a dope with a polymer dissolved in a solvent are removed by filtration, the method including filtering foreign matters in the dope with two or more filter units arranged in series, where the filter units include sintered metal filters having the same pore diameter.

The filtration accuracy of the filtering medium is refined in accordance with the demand for improvement of filtration accuracy against foreign matters contained in an optical film, particularly bright spot foreign matters. Accordingly, a problem such as clogging of a filtering medium arises, and means for recovering filtration efficiency by exchanging the filtering medium or washing the filtering medium each time the problem arises is required. For solving such a problem, PTL 6 describes a cellulose acetate having a small amount of insoluble foreign matters when dissolved in a solvent and which is excellent in filtration property; and a method for producing the cellulose acetate.

CITATION LIST

Patent Literature

PTL 1: Japanese Patent Laid-Open Publication No. 2003-221455
PTL 2: Japanese Patent Laid-Open Publication No. 2003-213004
PTL 3: Japanese Patent Laid-Open Publication No. 11-254466
PTL 4: Japanese Patent Laid-Open Publication No. 2003-326112
PTL 5: Japanese Patent Laid-Open Publication No. 2004-113897
PTL 6: International Publication No. WO 2001/072847

SUMMARY OF INVENTION

Technical Problem

Various methods for reducing the amount of foreign matters including black foreign matters and bright spot foreign matters have been heretofore studied as described in PTLS 1 to 6, but in particular, when cellulose containing a small amount of hemicellulose components and having a high degree of crystallinity as in linter pulp is used as a raw material, reduction of the amount of non-acetylated cellulose acetate (i.e. cellulose) or low-acetylation-degree cellulose acetate which is contained in cellulose acetate and which causes bright spot foreign matters in an optical film is not sufficient in the current situation.

In view of the above-described current situation, an object of the present invention is to provide a cellulose acetate which can be used to obtain an optical film having a very small amount of bright spot foreign matters, with excellent production efficiency, even when cellulose containing a small amount of hemicellulose components and having a high degree of crystallinity is used as a raw material.

Solution to Problem

A first aspect of the present invention relates to a cellulose acetate in which a content ratio by mole of mannose units to a sum of xylose units, mannose units and glucose units, which are sugar chain components, is 0.04 mol % or less, and the filtration index K measured by the following measurement method is 30 mL$^{-1}$ or less.
(Measurement Method)

The cellulose acetate is dissolved in a mixed solvent containing methylene chloride and methanol at a weight ratio of methylene chloride/methanol of 9/1 to obtain a solution with a solid concentration of 16% by weight. The temperature of the solution is adjusted to 25° C., and the solution is subjected to constant-pressure filtration under a pressure of 3 kg/cm$^2$ using a cloth obtained by stacking three sheets of calico (s 618) (diameter: 15 mm, filtration area: 1.77 cm$^2$). At this time, the filtration index k (mL$^{-1}$) is calculated from the following expression, where $P_1$ represents the amount of filtration (mL) up to 20 minutes after the start of filtration, and $P_2$ represents the amount of filtration (mL) from 0 to 60 minutes.

$$\text{Filtration index } K = \frac{2 - P_2/P_1}{P_1 + P_2} \times 10^4 \quad \text{[Mathematical Formula 1]}$$

In the cellulose acetate, the number of insoluble foreign matters having an equivalent spherical diameter of 20 μm or less, among foreign matters insoluble in dichloromethane/methanol (weight ratio 9:1) measured by FlowCAM (registered trademark) analysis is 70 or less per 1 mg of cellulose acetate.

In the cellulose acetate, the number of insoluble foreign matters having an equivalent spherical diameter of 10 μm or less, among foreign matters insoluble in dichloromethane/methanol (weight ratio 9:1) measured by FlowCAM (registered trademark) analysis is 60 or less per 1 mg of cellulose acetate.

Preferably, the cellulose acetate has a calcium content of 40 ppm or more and 80 ppm or less, a magnesium content of 1.0 ppm or more and 5.0 ppm or less, and a molecular weight distribution Mw/Mn of 2.30 or less and 2.05 or more.

A second aspect of the present invention is a method for producing the cellulose acetate, the method including a step of grinding linter pulp through a primary grinding step and a secondary grinding step, and then performing acetylation. The primary grinding step is a step of grinding water-free linter pulp into pulp pieces having an average area of 45 cm$^2$ or less by a disc refiner or a hammer mill, and the secondary grinding step is a step of grinding the pulp pieces under an impact action of an airflow grinder which includes a casing provided with an inlet and an outlet and having a cylindrical shape, and a rotor facing an inner peripheral surface of the casing and having a plurality of blade portions provided on an outer peripheral portion of the rotor.

A third aspect of the present invention is a method for producing the cellulose acetate, the method including the steps of: performing pretreatment and activation by adding acetic acid or acetic acid containing sulfuric acid in an amount of 1% by weight or more and 10% by weight or less to ground linter pulp; and performing acetylation. The step of performing pretreatment and activation includes a first pretreatment step and a second pretreatment step. The first pretreatment step includes adding acetic acid to the ground linter pulp, and the second pretreatment step includes adding more than 60 parts by weight and 100 parts by weight or less of acetic acid containing sulfuric acid in an amount of 1% by weight or more and 10% by weight or less to 100 parts by weight of the linter pulp subjected to the first pretreatment step.

Advantageous Effects of Invention

According to the present invention, it is possible to provide a cellulose acetate which can be used to obtain an optical film having a very small amount of bright spot foreign matters, with excellent production efficiency, even when cellulose containing a small amount of hemicellulose components and having a high degree of crystallinity is used as a raw material.

DESCRIPTION OF EMBODIMENTS

Figure 1:
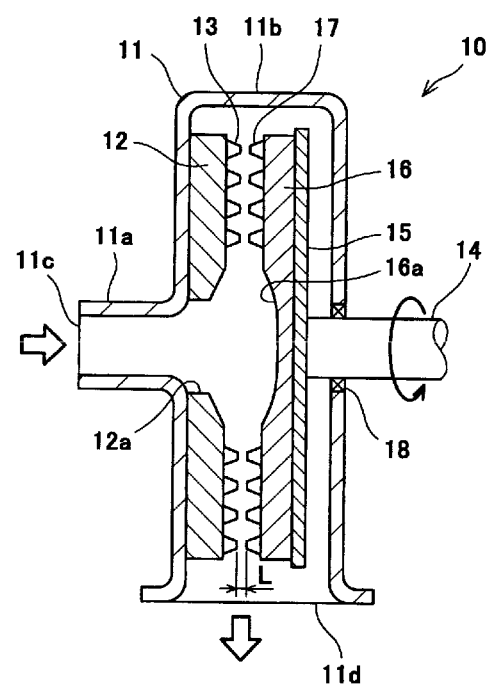
FIG. 1 is a sectional view of a disc refiner according to one embodiment which is used for primary grinding in grinding of pulp.

Hereinafter, an example of a preferred embodiment of the present invention will be described in detail.
[Cellulose Acetate]

In a cellulose acetate according to the present invention, the content ratio by mole of mannose units to the sum of xylose units, mannose units and glucose units, which are sugar chain components, is 0.04 mol % or less, and the filtration index K measured by the following measurement method is 30 mL$^{-1}$ or less.
(Measurement Method)

The cellulose acetate is dissolved in a mixed solvent containing methylene chloride and methanol at a weight ratio of methylene chloride/methanol of 9/1 to obtain a solution with a solid concentration of 16% by weight. The temperature of the solution is adjusted to 25° C., and the solution is subjected to constant-pressure filtration under a pressure of 3 kg/cm$^2$ using a cloth obtained by stacking three sheets of calico (s 618) (diameter: 15 mm, filtration area: 1.77 cm$^2$). At this time, the filtration index k (mL$^{-1}$) is calculated from the following expression, where $P_1$ represents the amount of filtration (mL) up to 20 minutes after the start of filtration, and $P_2$ represents the amount of filtration (mL) from 0 to 60 minutes.

$$\text{Filtration index } K = \frac{2 - P_2/P_1}{P_1 + P_2} \times 10^4 \quad \text{[Mathematical Formula 2]}$$

The upper limit of the content ratio by mole of mannose units to the sum of xylose units, mannose units and glucose units, which are sugar chain components, is preferably 0.04 mol % or less, more preferably 0.03 mol % or less, still more preferably 0.02 mol % or less. When the ratio of mannose units is high, defects such as streaks and unevenness may easily occur, thus causing adverse effects such as remaining of film pieces on a substrate. The lower limit of the ratio of mannose units is not particularly limited, and is, for example, 0.001 mol % or more.

The constituent ratio of constituent sugar chain components of cellulose acetate and sugar chain components of cellulose (pulp) which can be used as a raw material can be analyzed in the following manner.

200 mg of a sufficiently dried sample is precisely weighed, 3 mL of 72% sulfuric acid is added thereto, and the sample is completely dissolved over 2 hours or more using an ultrasonic wave while being cooled with ice water. 39 mL of distilled water is added to the resulting solution, and the mixture is sufficiently shaken, refluxed at 110° C. for 3 hours under a nitrogen flow, and allowed to cool for 30 minutes. 14 g of barium carbonate is then added, and the mixture is neutralized using an ultrasonic wave while being cooled with ice water. After 30 minutes, 10 g of barium carbonate is further added, and the mixture is neutralized to a pH 5.5 to 6.5, and filtered. The filtrate is diluted with ultrapure water by a factor of 100 in terms of a weight to prepare a sample.

The resulting sample is analyzed by ion chromatography under the following conditions.
High performance liquid chromatography (HPLC, Agilent 1200 Series System manufactured by Agilent Technologies, Inc.)
Detector: CoronaPlus CAD Detector
Column: Asahipak NH 2P-50 4E (250×4.6 mm) manufactured by Shodex Co., Ltd.
Guard column: Asahipak NH2P-50G 4A manufactured by Shodex Co., Ltd.
Eluent: ultrapure water/acetonitrile (for HPLC)=25/75 (v/v)
Eluent flow rate: 1.0 mL/min
Column temperature: 20° C.

The molar ratios of mannose units, xylose units and glucose units can be determined from calibration curves prepared in advance using mannose, xylose and glucose standard products. The content of each constituent sugar chain component is expressed by mol % with the sum of these three components set to 100.

(Filtration Index K)

The filtration index K of cellulose acetate is 30 mL$^{-1}$ or less, preferably 25 mL$^{-1}$ or less, more preferably 23 mL$^{-1}$ or less, and still more preferably 22 mL$^{-1}$ or less. When the filtration index K is 30 mL$^{-1}$ or less, clogging of the filtering medium or the like can be reduced, so that the number of steps of restoring filtration efficiency by replacing the filtering medium or washing the filtering medium can be reduced. As a result, the production efficiency of the optical film can be improved.

In the cellulose acetate of the present disclosure, the number of insoluble foreign matters having an equivalent spherical diameter of 20 μm or less, among foreign matters insoluble in dichloromethane/methanol (weight ratio 9:1) measured by FlowCAM (registered trademark) analysis is preferably 70 or less, more preferably 65 or less, still more preferably 60 or less per 1 mg of cellulose acetate. When the number of insoluble foreign matters is 70 or less, clogging of the filtering medium or the like can be reduced, so that the number of steps of restoring filtration efficiency by replacing the filtering medium or washing the filtering medium can be reduced. As a result, the number of bright spot foreign matters recognized in an optical film obtained from the cellulose acetate can be reduced, and the production efficiency of the optical film can be improved.

In addition, in the cellulose acetate of the present disclosure, the number of insoluble foreign matters having a sphere-equivalent diameter of 10 μm or less, among foreign matters insoluble in dichloromethane/methanol (weight ratio 9:1) measured by FlowCAM (registered trademark) analysis is preferably 60 or less, more preferably 55 or less, still more preferably 50 or less, most preferably 48 or less per 1 mg of cellulose acetate. This is because the number of bright spot foreign matters recognized in an optical film obtained from the cellulose acetate is reduced, the yield of the film is increased, and the production efficiency of the optical film is improved.

The amount of insoluble foreign matters can be measured by the following method in place of FlowCAM (registered trademark) analysis, but in the method, for example, when the amount of foreign matters in cellulose acetate is small, variations caused by external factors increase, so that an accurate difference cannot be observed.

Dichloromethane/methanol (weight ratio 9:1) is added to 3 to 5 g of a dried sample to a total amount of 150 g, and the mixture is stirred by a stirrer for 3 hours or more to obtain a cellulose acetate solution. A membrane filter (Millipore JC 10 μm) is dried in a vacuum dryer at 50° C. for 3 hours, and then weighed. The cellulose acetate solution is filtered through the membrane filter, and the filtration residue is washed three or more times each with 50 mL of dichloromethane/methanol (weight ratio 9:1). The membrane filter carrying the filtration residue is dried in a vacuum dryer at 50° C. for 3 hours, allowed to cool in a desiccator, and then weighed. The ratio (% by weight) of a weight increase (a weight obtained by subtracting the weight of the membrane filter from the weight of the membrane filter carrying the filtration residue) to the weight of the sample cellulose acetate is calculated as the amount of insoluble foreign matters.

(Calcium Content and Magnesium Content)

Calcium and magnesium contained in the cellulose acetate of the present disclosure are mostly derived from a neutralizing agent, a stabilizer or washing water which are used during production of cellulose acetate, and for example, the calcium and magnesium are present while adhering to the surfaces of cellulose acetate flakes, and electrostatically interacting with sulfuric acid ester portions formed during production or carboxyl groups contained in cellulose fibers.

The calcium content of cellulose acetate according to the present disclosure is preferably 40 ppm or more and 80 ppm or less, more preferably 45 ppm or more and 75 ppm or less, still more preferably 45 ppm or more and 70 ppm or less. This is because when the calcium content is low, the heat resistance of the cellulose acetate is deteriorated, and when the calcium content is excessively high, the number of insoluble foreign matters easily increases.

In the cellulose acetate according to the present disclosure, the magnesium content is preferably 1.0 ppm or more and 5.0 ppm or less, more preferably 2.0 ppm or more and 4.5 ppm or less, still more preferably 2.5 ppm or more and 4.0 ppm or less. This is because when the magnesium content is low, the heat resistance of the cellulose acetate is deteriorated, and when the calcium content is excessively high, the number of insoluble foreign matters easily increases.

The calcium content and the magnesium content of the cellulose acetate can be each measured by the following method.

3.0 g of an undried sample is weighed and taken in a crucible, carbonized on an electric heater, and then incinerated in an electric furnace at 750 to 850° C. for about 2 hours. The sample is allowed to cool for about 30 minutes, 25 mL of a 0.07% hydrochloric acid solution was added, and the sample is dissolve by heating at 220 to 230° C. The solution is allowed to cool, and then diluted in measuring cylinder to 200 mL total with distilled water, and the solution is used as a test solution. The absorbance of the test solution as well as a standard solution is measured by an atomic absorption spectrophotometer to determine the calcium (Ca) content and or the magnesium (Mg) content of the test solution, and the calcium (Ca) content or the magnesium (Mg) content of the sample is determined by performing conversion using the following expression. The moisture content in the sample can be measured using, for example, a Kett moisture meter (METTLER TOLEDO HB43). About 2.0 g of the sample containing water is placed on an aluminum tray of the Kett moisture meter, and heated at 120° C. until the weight does not change, so that the moisture content (% by weight) in the sample can be calculated from a weight change before and after heating.

$$\text{Ca or Mg content of sample (ppm)} = \frac{\text{Ca or Mg content of test solution (ppm)} \times 200}{\text{Weight of sample (g)} \times (1 - \text{moisture (\% by weight)}/100)}$$ [Mathematical Formula 3]

(Molecular Weight Distribution Mw/Mn)

The molecular weight distribution (molecular weight distribution Mw/Mn obtained by dividing the weight average molecular weight Mw by the number average molecular weight Mn) of the cellulose acetate of the present disclosure is preferably 2.30 or less and 2.05 or more, more preferably 2.25 or less and 2.10 or more, still more preferably 2.20 or less and 2.10 or more. When the molecular weight distribution is more than 2.30 or less than 2.05, the molecular weight distribution is broad or sharp, so that the optical performance of the film is affected, e.g. a target phase difference is not obtained. When the cellulose acetate has a molecular weight distribution of 2.30 or less and 2.05 or more, the viscosity of molten cellulose acetate can be decreased in formation of an optical film or the like by filtering the molten cellulose acetate, so that the amount of filtration until the filtering medium is clogged can be increased to improve the production efficiency of the optical film.

The molecular weight distribution Mw/Mn can be measured by the following method. A high performance liquid chromatography system can be used in which a detector for detecting a refractive index and light scattering is connected to a gel filtration column. For example, Shodex GPC SYSTEM-21H can be used as the high performance liquid chromatography system. As the detector, for example, a differential refractive index detector (RI) can be used. Measurement conditions of the gel permeation chromatography are as follows.

Solvent: dichloromethane
Column: Two pieces of TSKgel GMHXL (7.8×300 mm)
Guard column: TSKgel guardcolumn HXL-H
Sample concentration: 2000 ppm
Flow rate: 0.8 mL/min
Sample injection amount: 100 μL
Standard sample: PMMA (molecular weight: 1850, 7360, 29960, 79500, 201800, 509000 and 625500)
Column temperature: 28° C.

Both the weight average molecular weight (Mw) and the number average molecular weight (Mn) are measured under the same measurement conditions as described above. The molecular weight distribution can be calculated in accordance with the following expression from the weight average molecular weight and the number average molecular weight obtained from the measurement results.

Molecular weight distribution=Mw/Mn

Mw: weight average molecular weight, Mn: number average molecular weight

[Production of Cellulose Acetate]

A method for producing the cellulose acetate will be described in detail. The cellulose acetate according to the present disclosure can be produced by the following steps.

(1) a step of grinding linter pulp which is raw material cellulose;

(2) a step of pretreating the cellulose by adding acetic acid or acetic acid containing 1 to 10% by weight of sulfuric acid (i.e. sulfuric acid-containing acetic acid) in one time or two times;

(3) a step of acylating the pretreated cellulose;

(4) a saponification and hydrolysis step of completely neutralizing (or partially neutralizing) the sulfuric acid catalyst, and performing hydrolysis in the presence of the sulfuric acid catalyst (or remaining sulfuric acid);

and (5) a series of steps including purification and drying treatments. For a general method for producing a cellulose acetate, reference can be made to "Wood Chemistry" (Vol. 1) (Migita et al., Kyoritsu Publishing Co., Ltd., published in 1968, p.p. 180-190).

(Raw Material Cellulose)

As the linter pulp to be used as a raw material for the cellulose acetate of the present disclosure, cellulose having a high degree of polymerization, such as linter pulp, particularly cotton linter pulp, can be used. These linter pulps may be used singly or in combination of two or more thereof.

Linter pulp is preferable because it has a high cellulose purity and a small amount of coloring components, and a molded product has high transparency.

In addition, when the amount of hemicellulose components increases, the filtration property may be deteriorated, defects such as streaks and unevenness may easily occur during deposition, and film peelability may be deteriorated due to remaining of film pieces on a substrate, etc. Thus, the α-cellulose content (weight basis), which is an index for the degree of crystallinity of raw material cellulose, is preferably 97% or more and 100% or less, more preferably 98.5% or more and 100% or less, still more preferably 99% or more and 100% or less, most preferably 99.5% or more and 100% or less. Normally, the raw material cellulose may contain some carboxyl groups in, for example, a state of being bonded to cellulose molecules and/or hemicellulose molecules.

(Grinding Step)

When raw material cellulose is difficult to handle because it is supplied in the form of a sheet, etc., it is preferable to pass through a step of grinding the raw material cellulose in a dry process. As the step of grinding the raw material cellulose, for example, linter pulp is ground through a primary grinding step and a secondary grinding step. The primary grinding step is a step of grinding water-free linter pulp into pulp pieces having an average area of 45 cm$^2$ or less by a disc refiner or a hammer mill, and the secondary grinding step is a step of grinding the pulp pieces under an impact action of an airflow grinder which includes a casing provided with an inlet and an outlet and having a cylindrical shape, and a rotor facing an inner peripheral surface of the casing and having a plurality of blade portions provided on an outer peripheral portion thereof.

A disc refiner to be used in the primary grinding step will be described in detail. FIG. 1 is a sectional view of a disc refiner 10 to be used for primary grinding of pulp according to one embodiment. As shown in FIG. 1, the disc refiner 10 includes a casing 11 having a tubular introduction portion 11a provided with an inlet 11c, and a disk storage portion 11b connected to the introduction portion 11a and having a diameter larger than that of the introduction portion 11a. In the disk storage portion 11b, a fixed disk 12 and a rotating disk 16 are stored in such a manner as to face each other. The fixed disk 12 is fixed to the inner surface of the disk storage portion 11b, and has a circular ring shape in which a through-hole 12a communicating with a passage in the introduction portion 11a. The rotating disk 16 is separated from the disk storage portion 11b, and fixed to a rotating substrate 15 fixed to a rotating shaft 14. In the disk storage portion 11b, an outlet 11d is formed radially outward from the fixed disk 12 and the rotating disk 16.

The rotating disk 16 has a disk shape, and at a portion thereof which faces the through-hole 12a of the fixed disk 12, a concave surface 16a having an arc-shaped cross-section and recessed in a direction of going away from the through-hole 12a is formed. The rotating shaft 14 is rotatably supported on the casing 11 through a bearing 18, and rotationally driven by a driving source (not shown). On mutually opposed surfaces of the fixed disk 12 and the rotating disk 16, a plurality of tooth portions 13 and 17 are protrusively provided so as to face each other with a predetermined clearance L therebetween. In the present embodiment, the tooth portions 13 and 17 are pyramid teeth having a pyramidal shape. The shape of each of the tooth portions 13 and 17 is not limited thereto, and the tooth portions 13 and 17 may be, for example, linear teeth extending radially in the radial direction. In addition, the present invention is not limited to a configuration in which only one of the two opposed disks 12 and 16 is rotated, and both the disks 12 and 16 may be rotated in mutually opposite directions.

Figure 2:
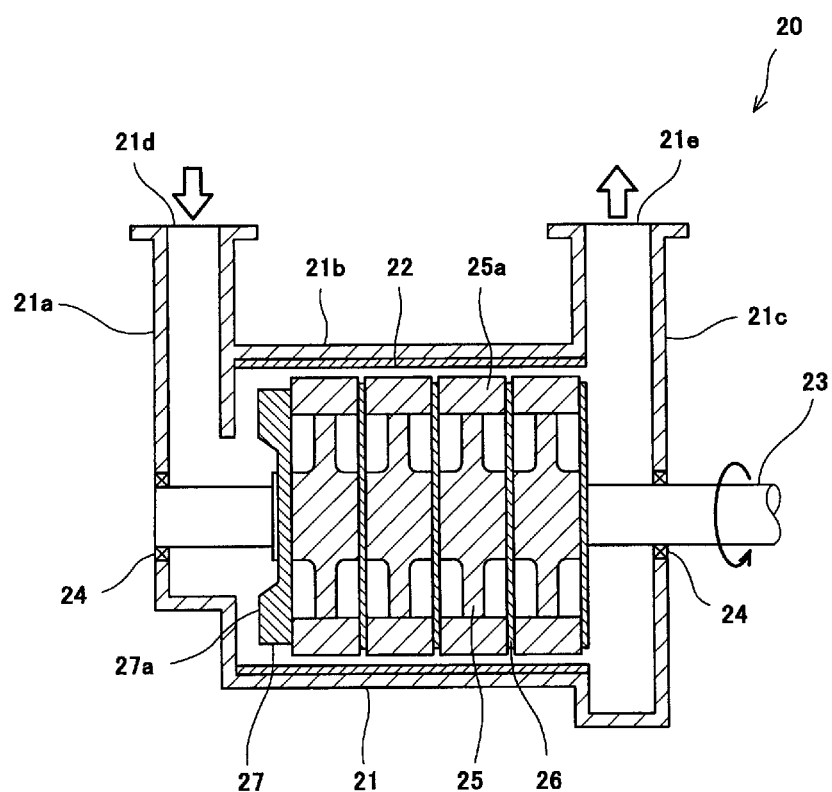
FIG. 2 is a sectional view of an airflow grinder according to one embodiment which is used for secondary grinding in grinding of pulp.

The airflow grinder to be used in the secondary grinding step will now be described in detail. FIG. 2 is a sectional view of an airflow grinder 20 to be used for secondary grinding in grinding of pulp according to one embodiment. As shown in FIG. 2, the airflow grinder 20 includes a casing 21 having an introduction portion 21a provided with an inlet 21d, a cylindrical rotor storage portion 21b connected to the introduction portion 21a, a lead-out portion 21c connected to the rotor storage portion 21b on a side opposite to the introduction portion 21a side and provided with an outlet 21e. The casing 21 has a cylindrical shape. A liner 22 is attached to the inner peripheral surface of the rotor storage portion 21b. The liner 22 is provided with a large number of grooves spaced in a circumferential direction and extending in a rotation axis direction. A rotor 25 fixed to a rotating shaft 23 is stored in the rotor storage portion 21b. The rotating shaft 23 is rotatably supported on the casing 21 through a bearing 24, and rotationally driven by a driving source (not shown).

The rotor 25 has a plurality of blade portions 25a provided on the outer peripheral portion thereof. A plurality of blade portions 25a are spaced in the circumferential direction of the rotor 25, and extend in a radial direction when viewed from the rotation axis. A disk-shaped partition plate 26 is provided between the rotors 25. The blade portion 25a is closer to the liner 22 than the partition plate 26. A disk-shaped distributor 27 fixed to the rotating shaft 23 is disposed on the introduction portion 21a side of the rotor 25 closest to the introduction portion 21a among a plurality of rotors 25. In the distributor 27, a vane portion 27a extending radially as viewed from the rotation axis is provided protrusively toward the introduction portion 21a. The rotor 25 and the distributor 27 are opposed to the liner 22 in a radial direction. The distributor 27 and/or the liner 22 may be absent.

A procedure for grinding linter pulp through the primary grinding step and the secondary grinding step will be described.

First, the primary grinding step of grinding sheet-shaped linter pulp into pulp pieces having a predetermined average area by the disc refiner 10 will be described. Specifically, sheet-shaped linter pulp is continuously introduced into the inlet 11c of the disc refiner 10 while the rotating shaft 14 is rotationally driven. Thus, the sheet-shaped linter pulp is guided to a gap between the tooth portion 13 of the fixed disk 12 and the tooth portion 17 of the rotating disk 16 by a centrifugal force associated with the rotation of the rotating disk 16, and a shearing force given to the sheet-shaped linter pulp by the tooth portion 13 and the tooth portion 17 grinds the sheet-shaped linter pulp to generate a large number of small pulp pieces. A large number of pulp pieces thus generated are guided radially outward from between the fixed disk 12 and the rotating disk 16 by a centrifugal force, and discharged from the outlet 11d to the outside of the casing 11.

The disc refiner 10 is set so as to grind sheet-shaped linter pulp into pulp pieces having an average area of 45 cm$^2$ or less. Specifically, by adjusting the clearance L between the opposed tooth portions 13 and 17, the number of rotations of the rotating shaft 14 and the like, the average area of the generated pulp pieces can be set to a desired value. In addition, water is not added beforehand to sheet-shaped linter pulp to be subjected to primary grinding. In addition, a mechanical grinder other than a disk refiner (e.g. a hammer mill) may be used for primary grinding.

Further, the secondary grinding step of further grinding the pulp pieces obtained by primary grinding using the airflow grinder 20 will be described. Specifically, a large number of pulp pieces having an average area of 45 cm$^2$ or less are sequentially introduced into the inlet 21d of the airflow grinder 20 while the rotating shaft 23 is rotationally driven. Thus, the pulp pieces guided into the rotor storage portion 21b through the introduction portion 21a are guided radially outward by a swirling flow accelerated by the blade portion 27a of the distributor 27, and are equally distributed in a gap (grinding chamber) between the rotor 25 and the liner 22 in a circumferential direction. The pulp pieces are minutely ground by an impact action caused by striking by the blade portion 25a, collision against the liner 22, and high-frequency pressure vibrations generated under the action of the three members: the blade portion 25a rotating at a high speed, the partition plate 26 and the liner 22. The minute powdered pulp guided from the rotor storage portion 21b to the lead-out portion 21c is discharged from the outlet 21e to the outside of the casing 21.

In this way, the size of large pulp pieces having a major axis of 5 mm or more can be reduced by grinding linter pulp in two stages with the primary grinding step and the secondary grinding step. The number of insoluble foreign matters having a size of 20 μm or less and a size of 10 μm or less per 1 mg of cellulose acetate in terms of a sphere-equivalent diameter of the resulting cellulose acetate can be reduced, and the filtration index K can be reduced, so that it is possible to provide a cellulose acetate which can be used to obtain an optical film having a very small amount of bright spot foreign matters, with excellent production efficiency.

(Pretreatments Step)

(2) In the step of pretreating the ground linter pulp by adding acetic acid or acetic acid containing sulfuric acid in an amount of 1% by weight or more and 10% by weight or less (i.e. sulfur-containing acetic acid) to the linter pulp.

The acetic acid and/or sulfur-containing acetic acid can be added in an amount of preferably 10 parts by weight or more and 500 parts by weight or less based on 100 parts by weight of raw material cellulose. As a method for adding acetic acid and/or sulfur-containing acetic acid to cellulose, mention is made of, for example, a method in which acetic acid or sulfur-containing acetic acid is added in one stage, and a method in which acetic acid or sulfur-containing acetic acid is added in two or more stages, such as a method in which sulfur-containing acetic acid is added after elapse of a certain amount of time after addition of acetic acid, or a method in which acetic acid is added after elapse of a certain amount of time after addition of sulfur-containing acetic acid. Among them, a method in which acetic acid or sulfur-containing acetic acid is added in two or more stages is preferable. As specific addition means, mention is made of a method in which acetic acid or sulfur-containing acetic acid is sprayed, and the mixture is stirred.

When acetic acid or sulfur-containing acetic acid is added in two or more times, the first time is referred to as a first pretreatment step, and the second is referred to as a second pretreatment step.

In the first pretreatment step, acetic acid is added in an amount of preferably 40 parts by weight or more and 100 parts by weight or less, more preferably 40 parts by weight or more and 90 parts by weight or less, still more preferably 40 parts by weight or more and 80 parts by weight or less based on 100 parts by weight of the ground linter pulp. When the amount of acetic acid added is less than 40 parts by weight, pretreatment is insufficient, and when the amount of acetic acid added is more than 100 parts by weight, acetic acid is supplied in an excessive amount with respect to the necessary amount, so that the usage rate is deteriorated.

In the first pretreatment step, a step of holding cellulose may be provided after addition of acetic acid for sufficiently penetrating acetic acid into cellulose. The lower limit of the holding time at this time is preferably 15 minutes or more, more preferably 30 minutes or more, still more preferably 40 minutes or more, even more preferably 50 minutes or more, even more preferably 60 minutes or more, and the upper limit of the holding time is preferably 24 hours or less, more preferably 8 hours or less, still more preferably 6 hours or less. The holding time is a time until a time point just before the start of the second pretreatment step after a time point at which addition of components to be added in the first pretreatment step is completed.

The holding temperature can be selected from a range of 0° C. or higher and 100° C. or lower, and is preferably 10° C. or higher and 40° C. or lower, more preferably 15° C. or higher and 35° C. or lower, still more preferably 20° C. or higher and 30° C. or lower.

In the second pretreatment step, acetic acid containing sulfuric acid is added in an amount of preferably more than 60 parts by weight and 100 parts by weight or less, more preferably 65 parts by weight or more and 90 parts by weight or less, still more preferably 65 parts by weight or more and 80 parts by weight or less based on 100 parts by weight of the linter pulp subjected to the first pretreatment step. When the amount of acetic acid added is 60 parts by weight or less, pretreatment does not evenly proceed, and when the amount of acetic acid added is more than 100 parts by weight, acetic acid containing sulfuric acid is supplied in an excessive amount with respect to the necessary amount, so that the usage rate is deteriorated.

The concentration of sulfuric acid in sulfuric acid-containing acetic acid to be added in the second pretreatment step is preferably 1% by weight or more and 10% by weight or less, more preferably 2% by weight or more and 9% by weight or less, still more preferably 2% by weight or more and 7% by weight or less, even more preferably 2% by weight or more and 5% by weight or less, even more preferably 2 parts by weight or more and 4% by weight or less based on the total amount of sulfuric acid and acetic acid. When the concentration of sulfuric acid is excessively low, the effect of pretreatments cellulose is small, the acetylation reaction becomes slow, so that the amount of by-produced unreacted materials easily increases, the number of insoluble foreign matters increases, and the filtration index K may increase. On the other hand, when the concentration of sulfuric acid is excessively high, depolymerization of cellulose may be noticeable, leading to reduction of the degree of polymerization of cellulose acetate, particularly cellulose triacetate.

In the second pretreatment step, it is preferable that acetic acid containing sulfuric acid is added to the linter pulp subjected to the first pretreatment step, the linter pulp is left standing at a temperature of preferably 10° C. or higher and 40° C. or lower, more preferably 20° C. or higher and 30° C. or lower for a time of, for example, about 60 minutes. At a low temperature of, for example, lower than 10° C., activation is insufficient, and at a temperature of higher than 40° C., the molecular weight decreases, and when the resulting cellulose acetate is used to obtain an optical film, the quality of the film is deteriorated.

(Acetylation Step)

(3) In the acetylation step of acetylating the pretreated cellulose, acetylation can be started by, for example, adding pretreated cellulose to a mixture containing acetic acid, acetic anhydride and sulfuric acid, or adding a mixture of acetic acid and acetic anhydride and sulfuric acid to pretreated cellulose.

In addition, when a mixture of acetic acid and acetic anhydride is prepared, the ratio of acetic acid and acetic anhydride is not particularly limited as long as the mixture contains acetic acid and acetic anhydride, the amount of acetic anhydride is preferably 200 to 400 parts by weight based on 300 to 600 parts by weight of acetic acid, more preferably 240 to 280 parts by weight based on 350 to 530 parts by weight of acetic acid.

As a ratio of cellulose, a mixture of acetic acid and acetic anhydride, and sulfuric acid in the acetylation reaction, the amount of the mixture of acetic acid and acetic anhydride is preferably 500 to 1000 parts by weight, the amount of the sulfuric acid is preferably 5 to 15 parts by weight, more preferably 7 to 14 parts by weight, still more preferably 8 to 13 parts by weight based on 100 parts by weight of cellulose. Here, the sulfuric acid is preferably concentrated sulfuric acid.

(3) In the acetylation step, the acetylation reaction of cellulose can be carried out by performing stirring at 20 to 55° C. for 30 minutes to 36 hours from the start of acetylation. This is because when the time is excessively short, production of completely trisubstituted cellulose may be insufficient, and when the time is excessively long, the degree of polymerization easily decreases.

In addition, the acetylation reaction of cellulose can be carried out under, for example, stirring conditions with the temperature elevated to 20 to 55° C. over 5 minutes to 36 hours from the start of acetylation, or the acetylation reaction can be carried out under stirring conditions without applying heat to the inside and outside of the reaction system from outside. In the early stage of the acetylation reaction, a reaction in a solid-liquid heterogeneous system proceeds, and it is preferable to spend as much time as possible on elevating the temperature for reducing the amount of unreacted substances by causing the acetylation reaction to proceed while suppressing a depolymerization reaction, but from the viewpoint of productivity, it is preferable to elevate the temperature over 2 hours or less, more preferably 1 hour or less.

The time taken for the acetylation reaction (hereinafter, also referred to as an acetylation reaction time) is preferably 130 to 200 minutes. Here, the acetylation reaction time is a time until a neutralizing agent is added after a time point at which raw material cellulose is added in the reaction system to start reacting with acetic anhydride.

(Saponification and Hydrolysis Step)

(4) In the saponification and hydrolysis step of partially neutralizing the sulfuric acid catalyst, and performing hydrolysis in the presence of the sulfuric acid catalyst (or remaining sulfuric acid), The sulfuric acid is bonded to cellulose as a sulfuric acid ester by the acetylation reaction, and therefore the sulfuric acid ester is saponified and removed for improving thermal stability after completion of the acetylation reaction. In saponification and hydrolysis, a neutralizing agent such as water, dilute acetic acid or a magnesium acetate aqueous solution is added for stopping the acetylation reaction. Moisture contained in the neutralizing agent reacts with acetic anhydride present in a reaction mixture containing cellulose acetate, so that acetic acid is generated, and the neutralizing agent can be added in such a manner that the reaction mixture containing cellulose acetate after the saponification and hydrolysis step has a moisture content of 5 to 70 mol % based on the amount of acetic acid. When the moisture content is less than 5 mol %, the saponification reaction does not proceed, and depolymerization proceeds, resulting in production of a low-viscosity cellulose acetate, and when the moisture content is more than 70 mol %, the cellulose ester (cellulose triacetate) after completion of the acetylation reaction is precipitated, and leaves the saponification and hydrolysis reaction system, so that the saponification reaction of the precipitated cellulose ester no longer proceeds.

Here, dilute acetic acid is a 1 to 50 wt % acetic acid aqueous solution. In addition, the magnesium acetate concentration of the magnesium acetate aqueous solution is preferably 5 to 30% by weight.

The reaction mixture containing cellulose acetate is any mixture containing cellulose acetate in each step until cellulose acetate flakes are obtained.

In addition, when the sulfate ion concentration in the reaction mixture containing cellulose acetate is high, the sulfuric acid ester cannot be efficiently removed, and therefore it is preferable to reduce the sulfate ion concentration by adding an aqueous solution of an alkaline earth metal salt of acetic acid such as magnesium acetate or an acetic acid-water mixed solution to form an insoluble sulfuric acid salt. Preferably, the amount of sulfate ions in the reaction mixture containing cellulose acetate is adjusted to 1 to 6 parts by weight based on 100 parts by weight of cellulose acetate (cellulose equivalent). For example, by adding an acetic acid-water mixed solution of magnesium acetate to the reaction mixture containing cellulose acetate, the acetylation reaction can be stopped concurrently with reducing the weight ratio of sulfate ions to 100 parts by weight of cellulose acetate (cellulose equivalent).

The time of saponification and hydrolysis (hereinafter, also referred to as an "hydrolysis time") is not particularly limited, and the time is, for example, 10 to 240 minutes when the acetylation degree is adjusted to 53 to 62%. Here, the hydrolysis time is a time until the saponification reaction is stopped after the start of adding a neutralizing agent.

In addition, saponification and hydrolysis is performed by holding the product for 20 to 120 minutes at an hydrolysis temperature of preferably 50 to 100° C., especially preferably 50 to 90° C. Here, the hydrolysis temperature is a temperature in the reaction system in the hydrolysis time.

In the saponification and hydrolysis step, the entire reaction system can be kept at a uniform and appropriate temperature by utilizing reaction heat of water and acetic anhydride, so that generation of a product having an excessively low acetylation degree is prevented.

(Purification and Drying Treatment)

(5) The purification method in purification and drying treatment is not particularly limited, and a known method can be used. For example, methods such as precipitation, filtration, washing, drying, extraction, concentration and column chromatography can be used singly, or two or more thereof can be appropriately combined and used, but from the viewpoint of operability, purification efficiency and the like, a method is preferable that cellulose acetate flakes are separated by precipitation (reprecipitation) operation. Precipitation (reprecipitation) can be performed by mixing a mixture containing cellulose acetate and a precipitating agent such as water, dilute acetic acid, a dilute calcium hydroxide aqueous solution or a magnesium acetate aqueous solution, separating the generated cellulose acetate (precipitate) to obtain the precipitate, and removing free metal components, sulfuric acid components and the like by washing with water. Here, water or dilute acetic acid is preferable as a precipitating agent to be used for obtaining a precipitate of cellulose acetate. This is because a sulfuric acid salt in the reaction mixture containing cellulose acetate is dissolved, and the sulfuric acid salt in cellulose acetate, which is obtained as a precipitate, is easily removed.

In particular, in addition to washing with water, an alkali metal compound and/or an alkaline earth metal compound, particularly a calcium compounds such as calcium hydroxide, may be added as a stabilizer if necessary for improving the thermal stability of cellulose acetate after the hydrolysis reaction (after complete neutralization). In addition, a stabilizer may be used in washing with water.

(5) The method of drying in purification and drying treatment is not particularly limited, and a known method can be used. For example, drying can be performed under conditions of air blowing, reduction of pressure and the like. As a drying method, mention is made of, for example, hot air drying. In this way, flake-shaped cellulose acetate (i.e. cellulose acetate flakes) is obtained.

The cellulose acetate of the present disclosure can be used for various optical films such as, for example, protective films for polarizing plates, color filters, substrate films of photographic photosensitive materials, films for display devices (e.g. optical compensation films such as optical compensation films for liquid crystal display devices), substrate films of anti-glare films and the like.

EXAMPLES

Hereinafter, the present invention will be described in further detail by way of examples, but the present invention is not limited to these examples.

Example 1

(1) Grinding Step

As a raw material, sheet-shaped cotton linter pulp (mannose units: 0.02 mol %, α-cellulose content: 97%) was treated with a disc refiner to obtain cotton-like cellulose (water content: 8.0% by weight).

(2) Activation Step

In a first pretreatment step, a predetermined amount of acetic acid shown in Table 1 was sprayed to 100 parts by weight of cotton-like cellulose, adequately stirred, and left standing at a temperature of 24° C. for 60 minutes.

In a second pretreatment step, sulfuric acid-containing acetic acid shown in Table 1 was added to the cellulose subjected to the first activation step, and the mixture was left standing at a temperature of 24° C. for 60 minutes.

(3) Acetylation Step

Predetermined amounts of acetic acid, acetic anhydride and sulfuric acid shown in Table 1 were mixed with cellulose activated through the second activation step, the mixture was held at 15° C. or lower for about 20 minutes, and the temperature of the reaction system was elevated to about 38° C. to perform acetylation. The acetylation reaction time is shown in Table 1.

(4) Saponification and Hydrolysis Step

Next, a 15 wt % acetic acid-water mixed solution of magnesium acetate was added until the concentration of water in the solution was 14 mol %, and the concentration of sulfate ions was 1.8 mol %, so that acetic anhydride was decomposed to stop the acetylation reaction, and hydrolysis was performed at 50° C. for 80 minutes.

(5) Purification and Drying Treatment

A reaction bath was put in dilute acetic acid with stirring to precipitate the product, the precipitate was immersed in a dilute calcium hydroxide aqueous solution, then separated by filtration, and dried to obtain cellulose acetate flakes. For the obtained cellulose acetate flakes, the constituent ratio of a sugar chain component (content ratio of mannose units), the filtration index K, the number of insoluble foreign matters, the calcium content and the magnesium content were determined in accordance with the following procedure. The results are shown in Table 2.

(Constituent Ratio of Sugar Chain Component)

200 mg of a sufficiently dried sample was precisely weighed, 3 mL of 72% sulfuric acid was added, and the sample was completely dissolved over 2 hours or more by an ultrasonic wave while being cooled with ice water. 39 mL of distilled water was added to the obtained solution, and the mixture was sufficiently shaken, refluxed at 110° C. for 3 hours under a nitrogen flow, and then allowed to cool for 30 minutes. Next, 14 g of barium carbonate was added, and the mixture was neutralized by an ultrasonic wave while being cooled with ice water. After 30 minutes, 10 g of barium carbonate was further added, and the mixture was neutralized to a pH 5.5 to 6.5, and filtered. The filtrate was diluted with ultrapure water by a factor of 100 in terms of a weight to prepare a sample.

The resulting sample was analyzed by ion chromatography under the following conditions.

High performance liquid chromatography (HPLC, Agilent 1200 Series System manufactured by Agilent Technologies, Inc.)
Detector: CoronaPlus CAD Detector
Column: Asahipak NH 2P-50 4E (250×4.6 mm) manufactured by Shodex Co., Ltd.
Guard column: Asahipak NH2P-50G 4A manufactured by Shodex Co., Ltd.
Eluent: ultrapure water/acetonitrile (for HPLC)=25/75 (v/v)
Eluent flow rate: 1.0 mL/min
Column temperature: 20° C.

The molar ratios of mannose units, xylose units and glucose units can be determined from calibration curves prepared in advance using mannose, xylose and glucose standard products. The content of each constituent sugar chain component was expressed by mol % with the sum of these three components set to 100.

(Filtration Index K)

The cellulose acetate was dissolved in a mixed solvent containing methylene chloride and methanol at a weight ratio of methylene chloride/methanol of 9/1 to obtain a solution with a solid concentration of 16% by weight. The temperature of the solution was adjusted to 25° C., and the solution was subjected to constant-pressure filtration under a pressure of 3 kg/cm² using a cloth obtained by stacking three sheets of calico (s 618) (diameter: 15 mm, filtration area: 1.77 cm²). At this time, the filtration index K (mL⁻¹) was calculated from the following expression, where $P_1$ represents the amount of filtration (mL) up to 20 minutes after the start of filtration, and $P_2$ represents the amount of filtration (mL) from 0 to 60 minutes.

$$\text{Filtration index } K = \frac{2 - P_2/P_1}{P_1 + P_2} \times 10^4 \quad \text{[Mathematical Formula 4]}$$

(Number of Insoluble Foreign Matters)

The number of insoluble foreign matters was measured by FlowCAM (registered trademark) analysis as shown below.

Dichloromethane/methanol (weight ratio 9:1) is added to 0.5 g of a dried sample to a total amount of 100 g, and the mixture was stirred by a stirrer for 2 hours or more to prepare a sample solution. A flow cell was set in the following FlowCAM (registered trademark) equipment, the sample solution was caused to flow, and the number of insoluble foreign matters having a sphere-equivalent diameter of more than 10 μm and 20 μm or less and a sphere-equivalent diameter of 10 μm or less was measured in accordance with the following method and setting parameters. The measured number of foreign matters per 0.02 mL was divided by the amount of the sample to calculate the number of foreign matters per 1 mg of cellulose acetate.

Instrumentation and Peripheral Equipment
FlowCAM (registered trademark) equipment: Model VS 1 (Fluid Imaging Technologies), serial number: 5051, Sony SX90 CR Camera
FlowCAM (registered trademark) software: DSP firmware version: 55; version 3.2.3
Flow cell: FC 100 (Fluid Imaging Technologies)
Objective lens: magnification of 10 times
Context Setting (Method and Setting Parameters)
Method: Manual Prime with Sample
Sample analysis: 0.500 mL volume, 0.200 mL analysis
Flow rate: 0.140 mL/minute
Automatic imaging speed: 19 frames per second
Efficiency: 30.4%

Operation time: 3.57 minutes
Distance to the nearest: 3 microns
Close Holes: 2 iterations
Image: four collage image borders and paddings
Particle segmentation: dark threshold 20.00, light threshold 18.00
Allowable area: left 1, right 1278, top 1, bottom 958
Camera: Shutter 8
Gain: 0
Automatic imaging speed: 19 frames per second
Flash camera delay: 100 microseconds
Flash duration: 7 microseconds
Diameter (ESD): minimum 4.00 microns, maximum 60.00 microns The diameters of individual particles were measured by Fluid Imaging Technologies software measurement technique known as an equivalent spherical diameter (ESD). The ESD refers to a mean feret measurement of particles based on 36 sample measurements (performed every 5°). The feret measurement refers to a vertical distance between parallel tangents that are in contact with the opposite side of the particle.

(Calcium Content and Magnesium Content)

3.0 g of an undried sample was weighed and taken in a crucible, carbonized on an electric heater, and then incinerated in an electric furnace at 750 to 850° C. for about 2 hours. The sample was allowed to cool for about 30 minutes, 25 mL of a 0.07% hydrochloric acid solution was added, and the sample was dissolve by heating at 220 to 230° C. The solution was allowed to cool, and then diluted in measuring cylinder to 200 mL total with distilled water, and the solution was used as a test solution. The absorbance of the test solution as well as a standard solution was measured by an atomic absorption spectrophotometer to determine the calcium (Ca) content and or the magnesium (Mg) content of the test solution, and the calcium (Ca) content or the magnesium (Mg) content of the sample was determined by performing conversion using the following expression. The moisture content in the sample can be measured using, for example, a Kett moisture meter (METTLER TOLEDO HB43). About 2.0 g of the sample containing water is placed on an aluminum tray of the Kett moisture meter, and heated at 120° C. until the weight does not change, so that the moisture content (% by weight) in the sample can be calculated from a weight change before and after heating.

[Mathematical Formula 5]

$$Ca \text{ or } Mg \text{ content of sample (ppm)} = \frac{Ca \text{ or } Mg \text{ content of test solution (ppm)} \times 200}{\text{Weight of sample (g)} \times (1 - \text{moisture (\% by weight)}/100)}$$

Example 2

(1) Grinding Step

As a raw material, sheet-shaped cotton linter pulp (mannose units: 0.01 mol %, α-cellulose content: 98%) was ground into pulp pieces having an average area of 45 cm$^2$ or less by a disc refiner, and further, using a turbo mill (T1000) manufactured by Freund Turbo Corporation was used as an airflow grinder which includes a casing provided with an inlet and an outlet and having a cylindrical shape, and a rotor facing the inner peripheral surface of the casing and having a plurality of blade portions provided on an outer peripheral portion of the rotor, the pulp pieces were ground at 1750 rpm to obtain cotton-like cellulose (water content: 7.4% by weight).

Except that in the steps subsequent to the activation step (2), acetic acid containing a predetermined amount of sulfuric acid as shown in Table 1 was added in the second pretreatment step of the activation step (2), and predetermined amounts of acetic acid, acetic anhydride and sulfuric acid shown in Table 1 were mixed, and the acetylation reaction time was changed to one shown in Table 1 in the acetylation step (3), the same procedure as in Example 1 was carried out to obtain cellulose acetate flakes. For the obtained cellulose acetate flakes, the constituent ratio of a sugar chain component (content ratio of mannose units), the filtration index K, the number of insoluble foreign matters, the calcium content and the magnesium content were determined in accordance with the same procedure as in Example 1. The results are shown in Table 2.

Example 3

Except that the raw material used in Example 2 was used, the raw material was ground under the same conditions as in Example 2 in the grinding step (1), and the acetylation reaction time was changed to one shown in Table 1 in the acetylation step (3), the same procedure as in Example 1 was carried out to obtain cellulose acetate. For the obtained cellulose acetate flakes, the constituent ratio of a sugar chain component (content ratio of mannose units), the filtration index K, the number of insoluble foreign matters, the calcium content and the magnesium content were determined in accordance with the same procedure as in Example 1. The results are shown in Table 2.

Comparative Examples 1 and 3

Except that acetic acid containing a predetermined amount of sulfuric acid as shown in Table 1 was added in the second pretreatment step of the activation step (2), and predetermined amounts of acetic acid, acetic anhydride and sulfuric acid shown in Table 1 were mixed, and the acetylation reaction time was changed to one shown in Table 1 in the acetylation step (3), the same procedure as in Example 1 was carried out to obtain cellulose acetate flakes of Comparative Examples 1 and 3. For the obtained cellulose acetate flakes, the constituent ratio of a sugar chain component (content ratio of mannose units), the filtration index K, the number of insoluble foreign matters, the calcium content and the magnesium content were determined in accordance with the same procedure as in Example 1. The results are shown in Table 2.

Comparative Example 2

Except that sulfuric acid-containing acetic acid was not added in the second pretreatment step of the activation step (2), and predetermined amounts of acetic acid, acetic anhydride and sulfuric acid shown in Table 1 were mixed, and the acetylation reaction time was changed to one shown in Table 1 in the acetylation step (3), the same procedure as in Example 1 was carried out to obtain cellulose acetate flakes. For the obtained cellulose acetate flakes, the constituent ratio of a sugar chain component (content ratio of mannose units), the filtration index K, the number of insoluble foreign matters, the calcium content and the magnesium content were determined in accordance with the same procedure as in Example 1. The results are shown in Table 2.

TABLE 1

|  |  | Example 1 | Example 2 | Example 3 | Comparative Example 1 | Comparative Example 2 | Comparative Example 3 |
|---|---|---|---|---|---|---|---|
| Grinding step | Primary grinding step | Disk refiner | Disk refiner | Disk refiner | Disk refiner | Disk refiner | Disk refiner |
|  | Secondary grinding step (airflow grinder) | — | Turbo mill | Turbo mill | — | — | — |
| Raw material | Linter pulp (parts by weight) | 100 | 100 | 100 | 100 | 100 | 100 |
| Activation step | First pretreatment step — Acetic acid (parts by weight) | 41 | 41 | 41 | 41 | 41 | 41 |
|  | Second pretreatment step — Sulfuric acid-containing acetic acid (parts by weigh) | 64 | 33 | 64 | 33 | 0 | 33 |
|  | Contained sulfuric acid (parts by weight) | 2 | 1 | 2 | 1 | 1 | 1 |
| Acetylation step | Acetic acid (parts by weight) | 396 | 396 | 396 | 396 | 396 | 396 |
|  | Acetic anhydride (parts by weight) | 285 | 285 | 285 | 285 | 285 | 285 |
|  | Sulfuric acid (parts by weight) | 11.7 | 10.7 | 11.7 | 10.7 | 10.7 | 10.7 |
|  | Acetylation reaction time (minutes) | 136 | 150 | 132 | 152 | 150 | 160 |

TABLE 2

|  | Ratio of mannose units [mol %] | Filtration index k [mL$^{-1}$] | Number of insoluble foreign matters [number/1 mg] Size of insoluble foreign matters | | Calcium content [ppm] | Magnesium content [ppm] |
|---|---|---|---|---|---|---|
|  |  |  | 10 μm or less | More than 10 μm and 20 μm or less |  |  |
| Example 1 | 0.02 | 29 | 52 | 12 | 65.1 | 3.9 |
| Example 2 | 0.01 | 21 | 49 | 20 | 48.7 | 3.3 |
| Example 3 | 0.01 | 20 | 46 | 12 | 57.2 | 2.5 |
| Comparative Example 1 | 0.01 | 52 | 67 | 15 | 67.9 | 4 |
| Comparative Example 2 | 0.02 | 69 | 85 | 31 | 67.3 | 3.9 |
| Comparative Example 3 | 0.01 | 34 | 77 | 28 | 59.0 | 1.3 |

The invention claimed is:

1. A cellulose acetate in which a content ratio by mole of mannose units to a sum of xylose units, mannose units and glucose units, which are sugar chain components, is 0.04 mol % or less, and a filtration index K measured by a measurement method is 30 mL$^{-1}$ or less;

wherein the measurement method comprises:

dissolving the cellulose acetate in a mixed solvent containing methylene chloride and methanol at a weight ratio of methylene chloride/methanol of 9/1 to obtain a solution with a solid concentration of 16% by weight;

adjusting a temperature of the solution to 25° C.;

subjecting the solution to constant-pressure filtration under a pressure of 3 kg/cm$^2$ using a cloth obtained by stacking three sheets of calico (s 618) with diameter: 15 mm and filtration area: 1.77 cm$^2$;

calculating a filtration index k (mL$^{-1}$) from the following expression, where P$_1$ represents an amount of filtration (mL) up to 20 minutes after a start of filtration, and P$_2$ represents the amount of filtration (mL) from 0 to 60 minutes $$\text{Filtration index } K = \frac{2 - P_2/P_1}{P_1 + P_2} \times 10^4.$$

2. The cellulose acetate according to claim 1, wherein a number of insoluble foreign matters having an equivalent spherical diameter of 20 μm or less, among foreign matters insoluble in dichloromethane/methanol, with a weight ratio of 9:1, measured by FlowCAM (registered trademark) analysis is 70 or less per 1 mg of cellulose acetate.

3. The cellulose acetate according to claim 1, wherein a number of insoluble foreign matters having an equivalent spherical diameter of 10 μm or less, among foreign matters insoluble in dichloromethane/methanol, with a weight ratio of 9:1, measured by FlowCAM (registered trademark) analysis is 60 or less per 1 mg of cellulose acetate.

4. The cellulose acetate according to claim 1, wherein the cellulose acetate has a calcium content of 40 ppm or more and 80 ppm or less, a magnesium content of 1.0 ppm or more and 5.0 ppm or less, and a molecular weight distribution Mw/Mn of 2.30 or less and 2.05 or more.

5. A method for producing the cellulose acetate according to claim 1, the method comprising:

a step of grinding linter pulp through a primary grinding step and a secondary grinding step, performing pretreatment and activation by adding acetic acid or acetic acid containing sulfuric acid in an amount of 1% by weight or more and 10% by weight or less to the ground linter pulp; and performing acetylation at 20 to 55° C., wherein the primary grinding step is a step of grinding water-free linter pulp into pulp pieces having an average area of 45 cm$^2$ or less by a disc refiner or a hammer mill, the secondary grinding step is a step of grinding the pulp pieces under an impact action of an airflow grinder which includes a casing provided with an inlet and an outlet and having a cylindrical shape, and a rotor facing an inner peripheral surface of the casing and having a plurality of blade portions provided on an outer peripheral portion of the rotor; and wherein the step of performing pretreatment and activation includes a first pretreatment step and a second pretreatment step, the first pretreatment step including adding acetic acid to the ground linter pulp and holding for 15 minutes to 24 hours at a temperature of 0° C. to 100° C., the second pretreatment step including adding more than 60 parts by weight and 100 parts by weight or less of acetic acid containing sulfuric acid in an amount of 1% by weight or more and 10% by weight or less to 100 parts by weight of the linter pulp subjected to the first pretreatment step left standing at a temperature of 10° C. to 40° C.

* * * * *